US011614650B2

(12) United States Patent
Nakamura et al.

(10) Patent No.: US 11,614,650 B2
(45) Date of Patent: Mar. 28, 2023

(54) DISPLAY DEVICE

(71) Applicant: Japan Display Inc., Tokyo (JP)

(72) Inventors: Tenfu Nakamura, Tokyo (JP); Kentaro Okuyama, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/670,623

(22) Filed: Feb. 14, 2022

(65) Prior Publication Data
US 2022/0171228 A1 Jun. 2, 2022

Related U.S. Application Data

(63) Continuation of application No. PCT/JP2020/024265, filed on Jun. 19, 2020.

(30) Foreign Application Priority Data

Aug. 19, 2019 (JP) .............................. JP2019-149915

(51) Int. Cl.
*G02F 1/1333* (2006.01)
*C09J 7/00* (2018.01)
(Continued)

(52) U.S. Cl.
CPC ............ *G02F 1/13336* (2013.01); *C09J 7/00* (2013.01); *G02F 1/1334* (2013.01);
(Continued)

(58) Field of Classification Search
CPC ............... G02F 1/13336; G02F 1/1334; G02F 2202/28; C09J 7/00; C09J 2203/318;
(Continued)

(56) References Cited

U.S. PATENT DOCUMENTS

| 5,808,713 A | 9/1998 | Broer et al. |
| 2002/0048438 A1 | 4/2002 | Veligdan |
| (Continued) | | |

FOREIGN PATENT DOCUMENTS

| CN | 111630582 A | * 9/2020 | ........... G02B 6/0078 |
| JP | H10-509537 A | 9/1998 | |
| (Continued) | | | |

OTHER PUBLICATIONS

Search Report issued in International Patent Application No. PCT/JP2020/024265 dated Sep. 8, 2020 and English translation of same. 7 pages.

(Continued)

*Primary Examiner* — Donald L Raleigh
(74) *Attorney, Agent, or Firm* — K&L Gates LLP (57) ABSTRACT

According to one embodiment, a display device includes a first display panel including a first and second transparent substrate, a first liquid crystal layer, and a first light-emitting element, a second display panel including a third and fourth transparent substrate, a second liquid crystal layer and a second light emitting element, a filling member provided between the first and second display panel and having a refractive index equal to that of the first to fourth transparent substrates, a first light guide bonded to the first and second display panel, and a first adhesive member provided between the first display panel and the first light guide and between the second display panel and the first light guide.

11 Claims, 8 Drawing Sheets

(51) Int. Cl.
*G02F 1/1334* (2006.01)
*F21V 8/00* (2006.01)

(52) U.S. Cl.
CPC ....... *C09J 2203/318* (2013.01); *G02B 6/0011* (2013.01); *G02F 2202/28* (2013.01)

(58) Field of Classification Search
CPC .. G02B 6/0011; G02B 6/0065; G02B 6/0078; F21S 2/00; G09F 9/00; G09F 9/30; G09F 9/35; G09F 9/40
See application file for complete search history.

(56) References Cited

U.S. PATENT DOCUMENTS

| | | |
|---|---|---|
| 2011/0149201 A1 | 6/2011 | Powell et al. |
| 2019/0079324 A1 | 3/2019 | Numata et al. |
| 2020/0174178 A1* | 6/2020 | Qin ...................... G02B 6/0065 |
| 2021/0041624 A1* | 2/2021 | Niwa ................... G02B 6/0078 |

FOREIGN PATENT DOCUMENTS

| | | |
|---|---|---|
| JP | H11-202308 A | 7/1999 |
| JP | 2001-092389 A | 4/2001 |
| JP | 2001-175204 A | 6/2001 |
| JP | 2002-520672 A | 7/2002 |
| JP | 2002-341791 A | 11/2002 |
| JP | 2016-020996 A | 2/2016 |
| JP | 2018-066871 A | 4/2018 |
| JP | 2019-053186 A | 4/2019 |

OTHER PUBLICATIONS

Written Opinion issued in International Patent Application No. PCT/JP2020/024265 dated Sep. 8, 2020. 4 pages.

* cited by examiner

DISPLAY DEVICE

CROSS-REFERENCE TO RELATED APPLICATIONS

This application is a Continuation Application of PCT Application No. PCT/JP2020/024265, filed Jun. 19, 2020 and based upon and claiming the benefit of priority from Japanese Patent Application No. 2019-149915, filed Aug. 19, 2019, the entire contents of all of which are incorporated herein by reference.

FIELD

Embodiments described herein relate generally to a display device.

BACKGROUND

Display devices which switches between transparency and scattering states by using polymer dispersed liquid crystal (PDLC) have been proposed. This type of devices are designed to prevent glare, and employ such technology to switch between transparency and scattering by partially applying a voltage to PDLC. For transparent display devices using PDLC, an edge-light mode, in which the light source is placed at an edge portion of the light guide, is employed. However, when the edge-light mode is used for the PDLC displays, such a problem arises that the luminance decreases as the location is farther away from the light source.

In the meantime, another technology is known in which multiple small-sized organic electroluminescent (EL) display panels are combined to form a large-scale organic electroluminescent display panel. In this case, in order to suppress the refraction and reflection of light at the junction between adjacent OLED display panels, a technology that OLED display panels are bonded to each other using an adhesive having a refractive index equal to that of the glass substrate is employed.

Further, in displays where multiple display panels are arranged in a tile-like pattern, the phenomenon where the boundary between adjacent display panels appears as a joint due to light reflection and refraction may occur. In order to prevent this, a technique of covering the boundary of adjacent display panels with a diffraction grating is known. Furthermore, such a technology is known as well to improve the visibility of patterns when observed from an oblique direction by adjusting the refractive index of the joint between display panels.

DETAILED DESCRIPTION

In general, according to one embodiment, a display device includes a first display panel comprising a first transparent substrate, a second transparent substrate opposing the first transparent substrate, a first liquid crystal layer located between the first transparent substrate and the second transparent substrate and containing a polymer and a liquid crystal molecule, and a first light-emitting element opposing an end surface of the second transparent substrate, a second display panel comprising a third transparent substrate, a fourth transparent substrate opposing the third transparent substrate, a second liquid crystal layer located between the third transparent substrate and the fourth transparent substrate and containing a polymer and a liquid crystal molecule and a second light emitting element opposing an end surface of the fourth transparent substrate, the second display panel opposing the first display panel on an opposite side to the second light emitting element, a filling member provided between the first display panel and the second display panel and having a refractive index equal to that of the first transparent substrate, the second transparent substrate, the third transparent substrate and the fourth transparent substrate, a first light guide bonded to the first display panel and the second display panel and opposing an emission surface of the first light emitting element and a first adhesive member provided between the first display panel and the first light guide and between the second display panel and the first light guide.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Figure 1:
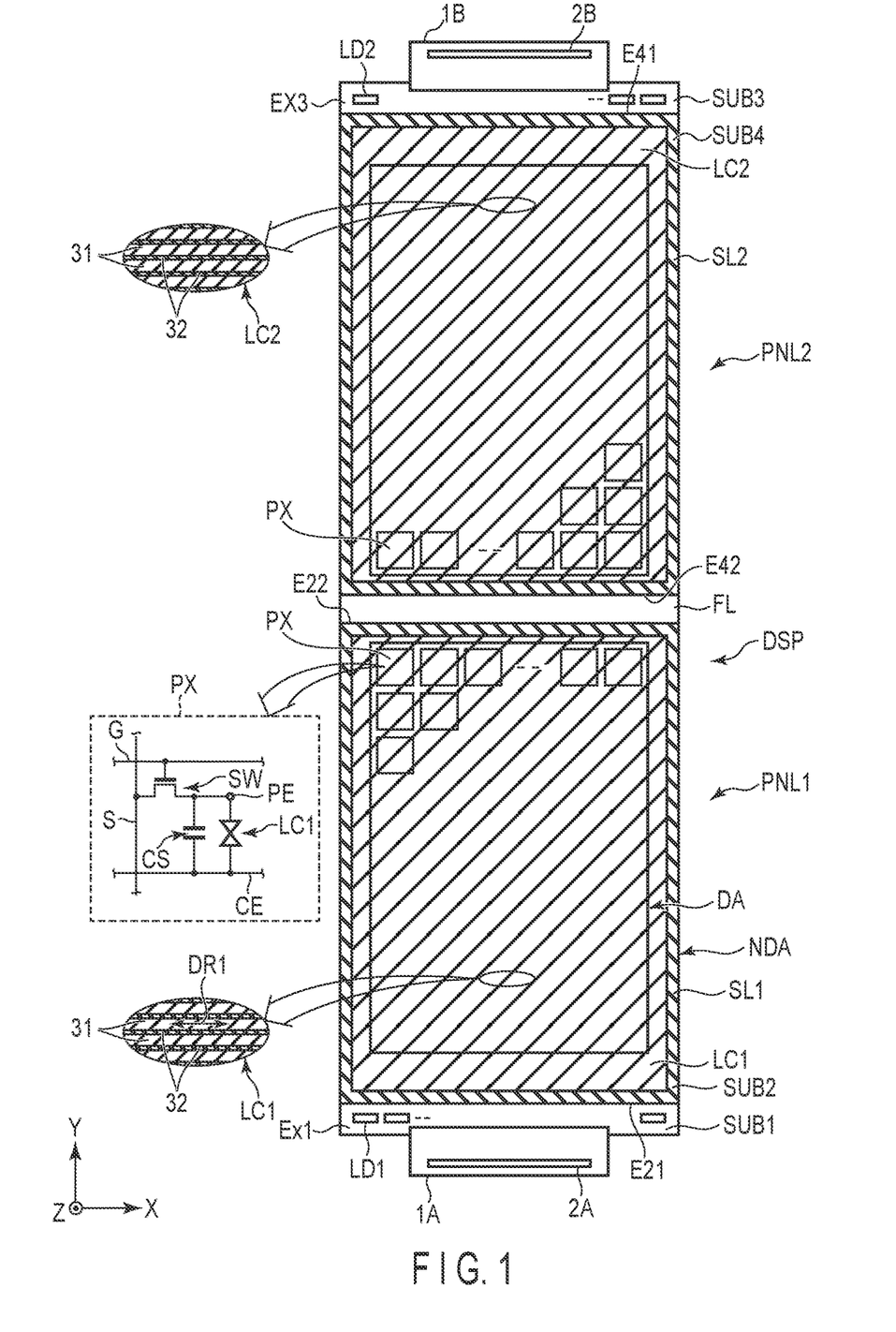
FIG. 1 is a plan view showing an example of a display device of one embodiment.

FIG. 1 is a plan view showing an example of the display device DSP of this embodiment.

For example, a first direction X, a second direction Y and a third direction Z are orthogonal to each other, but intersect at an angle other than 90 degrees. The first direction X and the second direction Y correspond to directions parallel to a main surface of the substrate that constitutes the display device DSP, and the third direction Z corresponds to the thickness direction of the display device DSP. In this specification, the direction from the first substrate SUB1 towards the second substrate SUB2 is referred to as "upper side" (or simply "upper"), and the direction from the second substrate SUB2 towards the first substrate SUB1 is referred to as "lower side" (or simply "lower"). With such expressions "the second member above the first member" and "the second member below the first member", the second member may be in contact with the first member or separated from the first member. Further, when it is assumed that there is an observation position for observing the display device DSP on a tip side of the arrow indicating the third direction Z, viewing from this observation position toward the X-Y plane defined by the first direction X and the second direction Y is referred to as "plan view".

In this embodiment, as an example of the display device DSP, a liquid crystal display device to which a polymer-dispersed liquid crystal is applied will be described. The display device DSP comprises a first display panel PNL1, a wiring substrate 1A, an IC chip 2A, a first light-emitting element LD1, a second display panel PNL2, a wiring substrate 1B, an IC chip 2B, a second light-emitting element LD2, and a filling member FL.

The first display panel PNL1 comprises a first substrate SUB1, a second substrate SUB2, a liquid crystal layer LC1 and a sealant SL1. The first substrate SUB1 and the second substrate SUB2 are formed into a flat plate shape parallel to the X-Y plane. The first substrate SUB1 and the second substrate SUB 2 are superimposed on each other in plan view. The first substrate SUB1 and the second substrate SUB 2 are bonded together by the sealant SL1. The liquid crystal layer LC1 is held between the first substrate SUB1 and the second substrate SUB2, and is sealed by the sealant SL1. In FIG. 1, the liquid crystal layer LC1 and the sealant SL1 are indicated by different shaded lines.

As shown schematically and enlarged in FIG. 1, the liquid crystal layer LC1 comprises a polymer-dispersed liquid crystal containing polymers 31 and liquid crystal molecules 32. For example, the polymers 31 are liquid crystalline polymers. The polymers 31 are formed into a streaky shape that extends along one direction. For example, the extending direction DR1 of the polymers 31 is along the first direction X. The liquid crystal molecules 32 are dispersed in gaps between the polymers 31 and are aligned so that their longitudinal axes are along the first direction X. Each of the polymers 31 and the liquid crystal molecules 32 has optical anisotropy or refractive index anisotropy. The responsiveness of the polymers 31 to electric fields is lower than that of the liquid crystal molecules 32 to electric fields.

For example, the alignment direction of the polymers 31 does not substantially change regardless of the presence or absence of an electric field. On the other hand, the alignment direction of the liquid crystal molecules 32 changes in response to the electric field when a voltage equal to or higher than a threshold is applied to the liquid crystal layer LC1. While no voltage is being applied to the liquid crystal layer LC1, the respective optical axes of the polymers 31 and the liquid crystal molecules 32 are parallel to each other, and the light entering the liquid crystal layer LC1 is transmitted therethrough without being substantially scattered (transparent state). While the voltage is being applied to the liquid crystal layer LC1, the optical axes of the polymers 31 and the liquid crystal molecules 32 cross each other, and the light entering the liquid crystal layer LC1 is scattered within the liquid crystal layer LC1 (scattering state).

The first display panel PNL1 comprises a display area DA that displays images and a frame-shaped non-display area NDA that surrounds the display area DA. The sealant SL1 is located on the non-display area NDA. The display area DA comprises pixels PX arranged in a matrix along the first direction X and the second direction Y.

As enlarged in FIG. 1, each pixel PX comprises a switching element SW, a pixel electrode PE, a common electrode CE, a liquid crystal layer LC1 and the like. The switching element SW is constituted by a thin-film transistor (TFT), for example, and is electrically connected to a respective scanning line G and a respective signal line S. The scanning line G is electrically connected to the switching element SW in each of the pixels PX aligned along the first direction X. The signal line S is electrically connected to the switching element SW of each of the pixels PX aligned along the second direction Y. The pixel electrode PE is electrically connected to the respective switching element SW. Each of the pixel electrodes PE opposes the common electrode CE along the third direction Z, and drives the liquid crystal layer LC1 (in particular, the liquid crystal molecules 32) by the electric field generated between the pixel electrode PE and the common electrode CE. The capacitance CS is formed, for example, between the electrode of the same potential as that of the common electrode CE and the electrode of the same potential as that of the pixel electrode PE.

The wiring substrate 1A is electrically connected to the extended portion Ex1 of the substrate SUB1. The wiring substrate 1A is a bendable flexible printed circuit board. The IC chip 2A is electrically connected to the wiring substrate 1A. The IC chip 2A incorporates therein, for example, a display driver that outputs signals necessary for image display. Note that the IC chip 2A may be electrically connected to the extended portion Ex1. The wiring substrate 1A and the IC chip 2A read signals from the first display panel PNL1 in some cases, but mainly functions as a signal source that supplies signals to the first display panel PNL1.

First light-emitting elements LD1 are provided on the extended portion Ex1 so as to be superimposed thereon and aligned to be spaced apart from each other along the first direction X. The first light-emitting elements LD1 oppose an end surface E21 of the second substrate SUB and emit light toward the end surface E21. Note that the second substrate SUB2 includes an end surface E22 on the opposite side to the end surface E21, and the light emitted from the first light-emitting elements LD1 reaches the end surface E22.

The second display panel PNL2 includes a third substrate SUB3, a fourth substrate SUB4, a liquid crystal layer LC2 and a sealant SL2. The third substrate SUB3 and the fourth substrate SUB4 formed into a flat plate shape parallel to the X-Y plane. The third substrate SUB3 and the fourth substrate SUB 4 are superimposed on each other in plan view. The third substrate SUB3 and the fourth substrate SUB 4 are bonded together by the sealant SL2. The liquid crystal layer LC2 is held between the third substrate SUB3 and the fourth substrate SUB4. SUB4, and is sealed by the sealant SL2. In FIG. 1, the liquid crystal layer LC2 and the sealant SL2 are indicated by different shaded lines. The liquid crystal layer LC2, as in the case of the liquid crystal layer LC1, comprises a polymer-dispersed liquid crystal containing polymers 31 and liquid crystal molecules 32.

The second display panel PNL2 comprises a display area DA that displays images and a frame-shaped non-display area NDA that surrounds the display area DA. The sealant SL2 is located on the non-display area NDA. The display area DA comprises pixels PX arranged in a matrix along the first direction X and the second direction Y. Each pixel PX has a configuration equivalent to that of the pixels PX of the first display panel PNL1.

The wiring substrate 1B is electrically connected to an extended portion Ex3 of the third substrate SUB3. The wiring substrate 1B is a bendable flexible printed circuit board. The IC chip 2B is electrically connected to the wiring substrate 1B. The IC chip 2B incorporates therein, for example, a display driver that outputs signals necessary for image display. Note that the IC chip 2B may be electrically connected to the extended portion Ex3. The wiring substrate 1B and the IC chip 2B read signals from the second display panel PNL2 in some cases, but mainly functions as a signal source to supply signals to the second display panel PNL2.

Second light-emitting elements LD2 are provided on the extended portion Ex3 so as to be superimposed thereon. These second light-emitting elements LD2 are aligned to be spaced apart from each other along the first direction X. These second light-emitting elements LD2 opposes an end surface E41 of the fourth substrate SUB4 and emit light toward the end surface E41. The fourth substrate SUB4 includes an end surface E42 on the opposite side of the end surface E41, and the light emitted from the second light-emitting elements LD2 reaches the end surface E42.

The second display panel PNL2 opposes the first display panel PNL1 on the opposite side of the second light-emitting elements LD2. The filling member FL is located between the first display panel PNL1 and the second display panel PNL2. As shown in the figure, the display device DSP can be made larger by connecting multiple display panels together. In the example shown in the figure, two display panels are connected, but the configuration is not limited to this example. Three or more display panels may be connected together. As will be described later, at least one cover member is superimposed on the first display panel PNL1, the second display panel PNL2 and the entire surface of the filling member FL.

Figure 2:
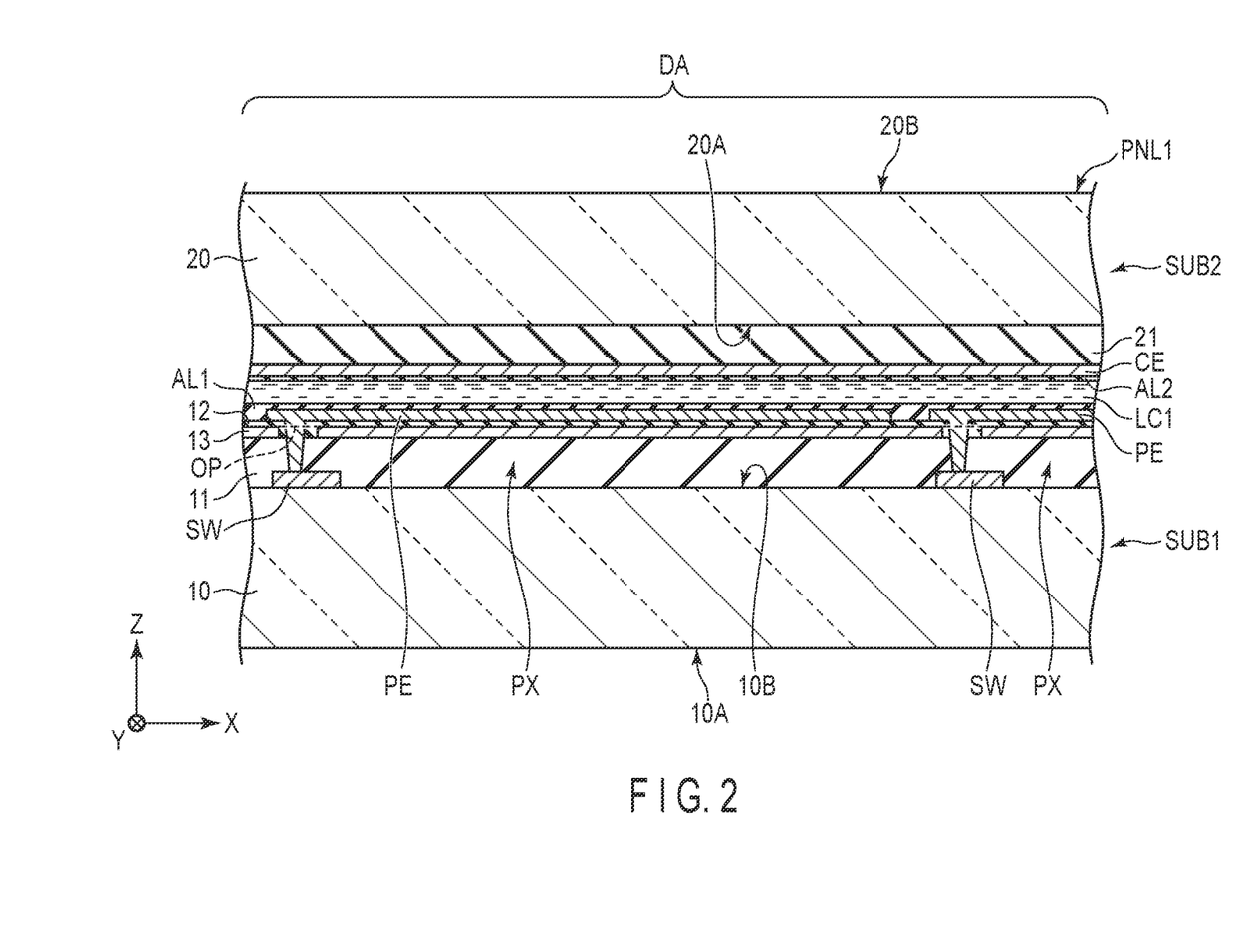
FIG. 2 is a cross-sectional view showing a display unit of a first display panel shown in FIG. 1.

FIG. 2 is a cross-sectional view showing the display area DA of the first display panel PNL1 shown in FIG. 1.

The first substrate SUB1 comprises a first transparent substrate 10, an organic insulating film 11, capacitive insulating films 12, capacitive electrodes 13, switching elements SW, pixel electrodes PE and an alignment film AL1.

The first transparent substrate 10 comprises a main surface 10A and a main surface 10B on an opposite side to the main surface 10A. The switching elements SW are located on a main surface 10B side. The switching elements SW may be of a bottom gate type, in which the gate electrode is located below the semiconductor layer, or of a top gate type, in which the gate electrode is located above the semiconductor layer. The semiconductor layer is formed, for example, of amorphous silicon, but may as well be formed of polycrystalline silicon or oxide semiconductor.

The organic insulating film 11 covers the switching elements SW. Further, the organic insulating films 11 are located between the first transparent substrate 10 and the respective pixel electrodes PE. The scanning lines G and the signal lines S shown in FIG. 1 are located between the first transparent substrate 10 and the respective organic insulating films 11, but are not shown here. The capacitive electrodes 13 are disposed between the respective organic insulating films 11 and the respective capacitive insulating films 12. Each pixel electrode PE is disposed for each pixel PX between the respective capacitive insulating film 12 and the alignment film AL1. The pixel electrodes PE are electrically connected to the switching elements SW, respectively, through openings OP of the capacitive electrode 13. Each pixel electrode PE overlap the respective capacitive electrode 13 while interposing the respective capacitive insulating film 12 therebetween, to form the capacitance CS of the respective pixel PX. The alignment film AL1 covers the pixel electrodes PE. The alignment film AL1 is in contact with the liquid crystal layer LC1.

The second substrate SUB2 comprises a second transparent substrate 20 opposing the first transparent substrate 10, a common electrode CE, an organic insulating film 21 and an alignment film AL2. The second transparent substrate 20 comprises a main surface 20A and a main surface 20B on the opposite side of the main surface 20A. The main surface 20A of the second transparent substrate 20 opposes the main surface 10B of the first transparent substrate 10. The main surface 20A of the second transparent substrate 20 opposes the main surface 10B of the first transparent substrate 10. The organic insulating film 21 is provided on the main surface 20A, and is located between the second transparent substrate 20 and the common electrode CE. The common electrode CE is provided between the liquid crystal layer LC1 and the organic insulating film 21. The common electrode CE is disposed over a plurality of pixels PX and opposes a plurality of pixel electrodes PE along the third direction Z. The alignment film AL2 covers the common electrode CE. Further, the alignment film AL2 is in contact with the liquid crystal layer LC1. Note that the second substrate SUB2 may comprise a light-shielding layer directly above the scanning lines G, the signal lines S and the switching elements SW.

The first transparent substrate 10 and the second transparent substrate 20 are insulating substrates such as glass or plastic substrates. The organic insulating films 11 and 21 are each formed of a transparent insulating material such as acrylic resin. The capacitive insulating film 12 is an inorganic insulating film such as of silicon nitride. The capacitive electrodes 13, the pixel electrodes PE and the common electrode CE are each formed of a transparent conductive material such as indium tin oxide (ITO) or indium zinc oxide (IZO). The alignment films AL1 and AL2 are subjected to an aligning treatment along the first direction X. The aligning treatment may be a rubbing treatment or a photo-alignment treatment. The liquid crystal layer LC1 is located between the first transparent substrate 10 and the second transparent substrate 20. Note that FIG. 2 shows the display area DA of the first display panel PNL1, but the display area DA of the second display panel PNL2 as well has a similar configuration to that of the first display panel PNL1.

Figure 3:
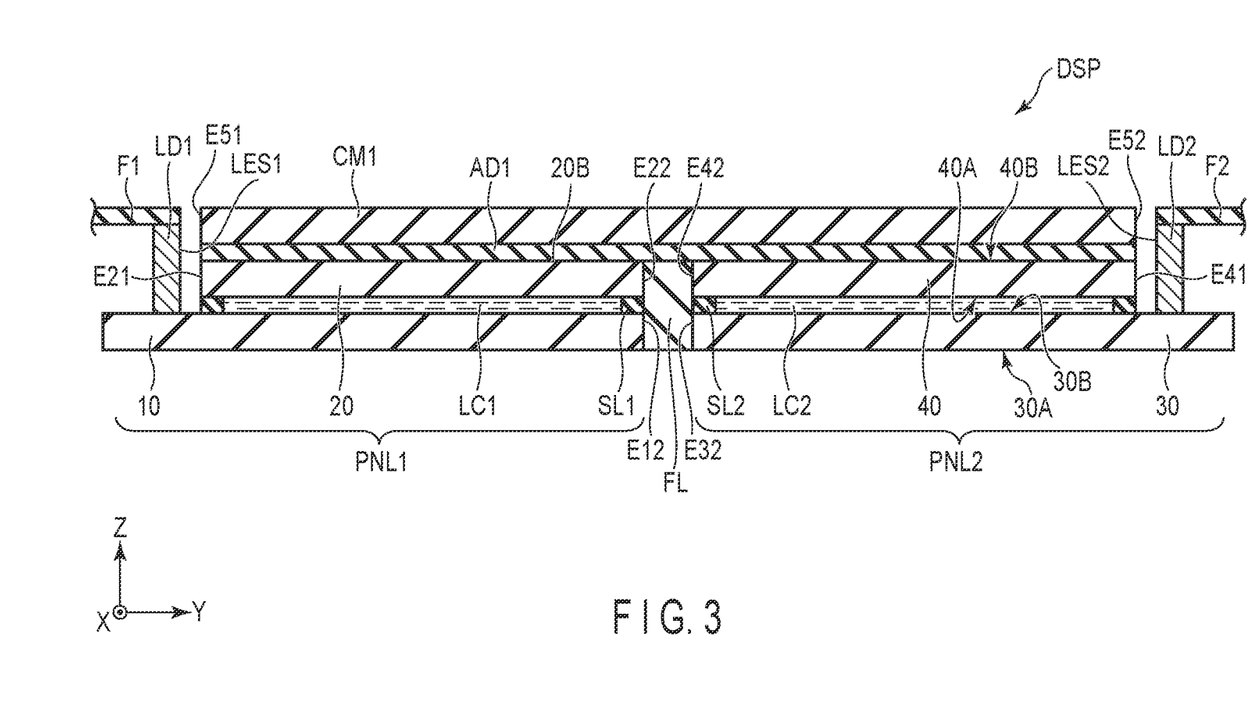
FIG. 3 is a cross-sectional view showing the display device of this embodiment.

FIG. 3 is a cross-sectional view showing the display device DSP of this embodiment.

In addition to the configuration described above, the display device DSP comprises a first cover member (first light guide) CM1 and an adhesive member AD1 which adheres the first cover member CM1 to the first display panel PNL1 and the second display panel PNL2.

The second display panel PNL2 comprises a third transparent substrate 30, a fourth transparent substrate 40 opposing the third transparent substrate 30, a liquid crystal layer LC2, a sealing material SL2, and second light-emitting elements LD2. The third transparent substrate 30 comprises a main surface 30A and a main surface 30B on an opposite side to the main surface 30A. The fourth transparent substrate 40 comprises a main surface 40A and a main surface 40B on an opposite side to the main surface 40A. The main surface 40A of the fourth transparent substrate 40 opposes the main surface 30B of the third transparent substrate 30. The liquid crystal layer LC2 is located between the third transparent substrate 30 and the fourth transparent substrate 40. The first light-emitting elements LD1 are electrically connected to the wiring substrate F1. The second light-emitting elements LD2 are electrically connected to the wiring substrate F2.

The first transparent substrate 10 includes an end surface E12 on a second display panel PNL2 side. The second transparent substrate 20 includes an end surface E21 on a first light-emitting element LD1 side 21, and an end surface E22 on the second display panel PNL2 side. The third transparent substrate 30 includes an end surface E32 on the first display panel PNL1 side. The fourth transparent substrate 40 includes an end surface E41 on the second light emitting element LD2 side and an end surface E42 on the first display panel PNL1 side. In the example shown in the figure, the end surface E22 opposes the end surface E42 along the second direction Y. The end surface E12 opposes the end surface E32 along the second direction Y. A light-emitting surface LES1 of each first light-emitting element LD1 opposes the end surface E21 along the second direction Y. A light-emitting surface LES2 of each second light-emitting element LD2 opposes the end surface E41 along the second direction Y.

The first cover member CM1 is adhered to the first display panel PNL1 and the second display panel PNL2.

More specifically, the first cover member CM1 is adhered to the main surface 20B of the second transparent substrate 20 and the main surface 40B of the fourth transparent substrate 40. The first cover member CM1 includes an end surface E51 opposing the light-emitting surface LES1 of each first light-emitting element LD1, and an end surface E52 opposing the light-emitting surface LES2 of each second light-emitting element LD2. The first adhesive member AD1 is located between the first display panel PNL1 and the first cover member CM1, and between the second display panel PNL2 and the first cover member CM1. The first display panel PNL1 and the second display panel PNL2 are connected by the first cover member CM1.

The filling member FL fills in the gap between the first display panel PNL1 and the second display panel PNL2. The filling member FL is in contact with the first adhesive member AD1. The filling member FL is in contact with the end surface E12, the end surface E22, the end surface E32, and the end surface E42. The filling member FL has a refractive index equal to that of the first transparent substrate 10, the second transparent substrate 20, the third transparent substrate 30 and the fourth transparent substrate 40. For example, when the first transparent substrate 10, the second transparent substrate 20, the third transparent substrate 30 and the fourth transparent substrate 40 are formed of glass, the refractive indexes thereof are about 1.51. The refractive index of the filling member FL is about 1.51.

The filling member FL is formed from a resin such as silicon resin and epoxy resin, a sealed optical oil, or a film-like glue such as a high refractive-index optically clear adhesive (OCA) sheet. When the filling member FL is a resin, it is preferable to form it by heat curing rather than UV curing in order to prevent damage to the liquid crystal layers LC1 and LC2. When the filling member FL is a film-like glue, the gap between the first display panel PNL1 and the second display panel PNL2 can be filled, and the first display panel PNL1 and the second display panel PNL2 can be bonded together at the same time. When the filling member FL is a film-type glue, the filling member FL has such a thickness as to cover the minute irregularities of the end surface E12, the end surface E22, the end surface E32 and the end surface E42.

For example, the refractive index of the filling member FL and the refractive index of the first adhesive material AD1 are different from each other. In this case, the refractive index of the filling member FL is about 1.51, and the first adhesive material AD1 is, for example, an OCA sheet that has a refractive index different from that of the filling member FL.

The refractive index of the filling member FL and the refractive index of the first adhesive member AD1 may be equal to each other. In this case, the refractive index of the filling member FL and the refractive index of the first adhesive member AD1 are each about 1.5. Here, at this time, for example, the first adhesive member AD1 and the filling member FL are high-refractive-index OCA sheets of the same material. It is preferable that the high-refractive-index OCA sheets should be formed by thermal curing rather than UV curing in order to prevent damage to the liquid crystal layers LC1 and LC2. The refractive index of the first adhesive member AD1 is equal to the refractive index of the first transparent substrate 10, the second transparent substrate 20, the third transparent substrate 30, the fourth transparent substrate 40 and the first cover member CM1. Therefore, the light entering the first cover member CM1 can easily pass through the first adhesive member AD1 to reach the liquid crystal layers LC1 and LC2. With this configuration, the light guided in the first cover member CM1 between the end surface E51 and the end surface E52 can be reduced and the light that contributes to scattering can be increased.

Figure 4:
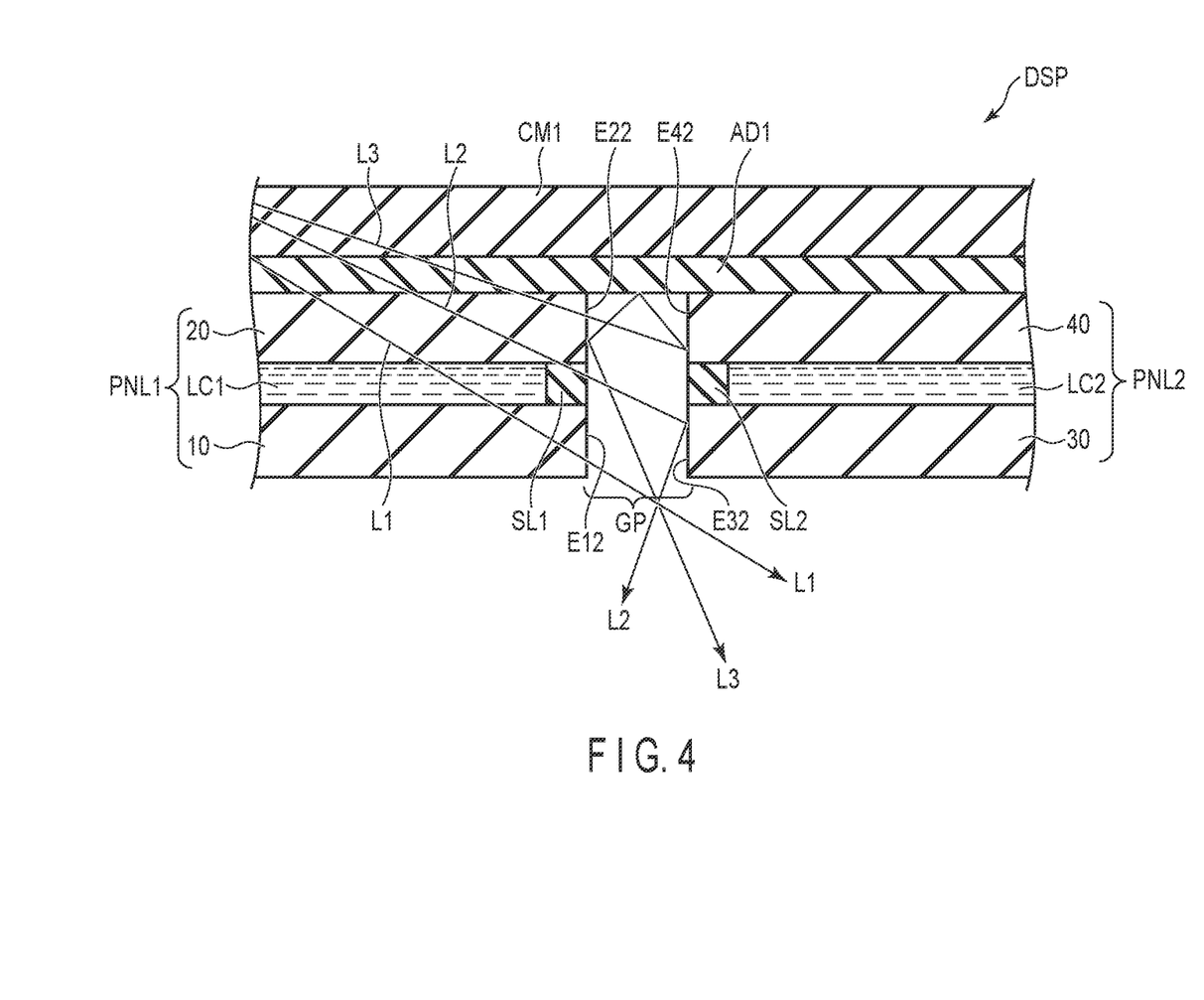
FIG. 4 is a cross-sectional view of a display device of a comparative example to this embodiment.

FIG. 4 is a cross-sectional view showing a display device DSP according to a comparative example of this embodiment. The display device DSP shown in FIG. 4 is different from the display device DSP of FIG. 3 in that the filling member FL is not formed.

In the comparative example shown in FIG. 4, an air layer GP is formed between the first display panel PNL1 and the second display panel PNL2. The light incident on the air layer GP proceeds as indicated by light rays L1, L2 and L3 shown in the figure. The light ray L1 enters the air layer GP and passes through the display unit DSP to be output therefrom downwards. The light ray L2 enters the air layer GP, and is reflected by the end surface E12 of the first transparent substrate 10, the end surface E22 of the second transparent substrate 20, the end surface E32 of the third transparent substrate 30 and the end surface E42 of the fourth transparent substrate 40. The end surfaces E12, E22, E32 and E42 are microscopically irregular and therefore they reflect light. The light ray L2 is made incident on the end surfaces E12, E22, E32 and E42, and passes through the display unit DSP to be output therefrom downwards. The light ray L3 enters the air layer GP and is multiply reflected by various factors in the air layer GP. Due to the configuration of the air layer GP thus formed, bright lines may become visible along the air layer GP due to the light rays L1, L2 and L3. In other words, the space between the first display panel PNL1 and the second display panel PNL2 may emit light and be visible.

According to this embodiment, as shown in FIG. 3, the filling member FL is placed between the first display panel PNL1 and the second display panel PNL2. The refractive index of the filling member FL is equal to the refractive index of the first transparent substrate 10, the second transparent substrate 20, the third transparent substrate 30 and the fourth transparent substrate 40. Therefore, the light reflected from the end surface E12 can easily proceed to the first transparent substrate 10, the light reflected from the end surface E22 can easily proceed to the second transparent substrate 20, the light reflected from the end surface E32 can easily proceed to the third transparent substrate 30, and the light reflected from the end surface E42 can easily proceed to the fourth transparent substrate 40. Thus, the light lost in the air layer GP can be used for scattering in the first display panel PNL1 and the second display panel PNL2. Further, it is possible suppress the space between the first display panel PNL1 and the second display panel PNL2 from emitting light to be visible.

The display device DSP of this embodiment employs an edge-light mode which comprises first light source elements LD1 opposing the end surface E51 of the first cover member CM1 and second light source elements LD2 opposing edge surface E5. With the edge-light mode, the luminance may decrease as the distance from the light source increases. In other words, in the first display panel PNL1, the luminance decreases from the edge surface E21 towards the edge surface E22, whereas in the second display panel PNL2, the luminance decreases from the end surface E41 to the end surface E42. With the configuration of this embodiment, the light transmitted through the filling member FL enters from the end surfaces E12, E22, E32 and E42, the light transmitted through the filling member FL, and therefore the luminance on an end surface E22 side of the first display panel PNL1 and the luminance of an end surface E42 side of the second display panel PNL2 can be enhanced. Thus, it is possible to make the luminance within the surface area close to uniform.

Further, with the edge-light mode, the amount of light of a color used on the light source side decreases as the location is farther from the light sources, which may cause a complementary color, in which and the display color changes from the desired color at a location distant away from the light source. According to the configuration of this embodiment, the light transmitted through the filling member FL enters from the end surfaces E12, E22, E32 and E42, and therefore the amount of light for each color can be complemented, thus making it possible to improve the complementary color.

Figure 5:
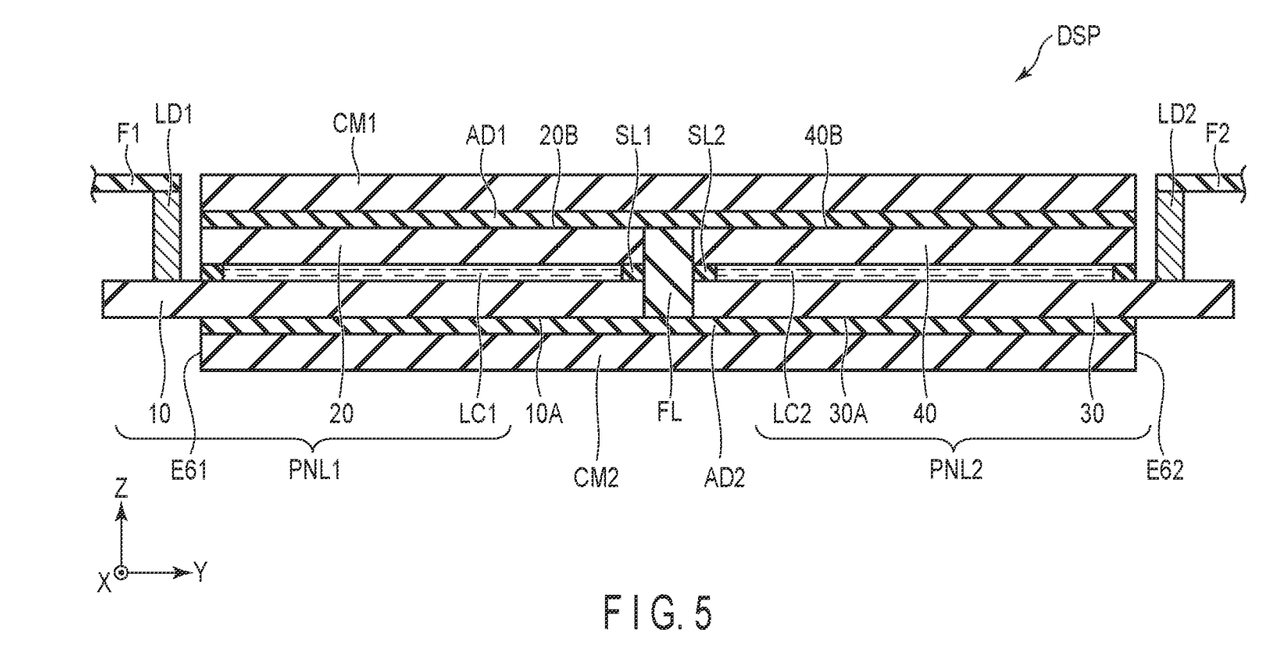
FIG. 5 is a diagram showing the first modified example of the present embodiment.

FIG. 5 shows the first modified example of the embodiment. The configuration shown in FIG. 5 is different from that of FIG. 3 in that the second cover member (second light guide) CM2 is adhered on the first display panel PNL1 and the second display panel PNL2.

The second cover member CM2 is located on the opposite side to the first cover member CM1 with respect to the first display panel PNL1 and the second display panel PNL2. The second cover member CM2 is adhered onto to the main surface 1A of the first transparent substrate 10 and the main surface 30A of the third transparent substrate 30. The second cover member CM2 includes an end surface E61 and an end surface E62. The second adhesive member AD2 is located between the first display panel PNL1 and the second cover member CM2, and between the second display panel PNL2 and the second cover member CM2. The first display panel PNL1 and the second display panel PNL2 are located between the first cover member CM1 and the second cover member CM2. The first display panel PNL1 and the second display panel PNL2 are sandwiched between the first cover member CM1 and the second cover member CM2 from an upper side and a lower side, and with this configuration, the strength of the display device DSP can be improved. Note that the filling member FL is in contact with the second adhesive member AD2.

For example, the refractive index of the filling member FL and the refractive index of the first adhesive member AD1 and the second adhesive member AD2 are different from each other. In this case, the refractive index of the filling member FL is about 1.51, and the first adhesive member AD1 and the second adhesive member AD2 are, for example, OCA sheets having a refractive index different from that of the filling member FL.

The refractive index of the filling member FL and the refractive index of the first adhesive member AD1 and the second adhesive member AD2 may be equal to each other. In this case, the refractive index of the filling member FL, the first adhesive member AD1 and the second adhesive member AD2 is about 1.51. In this case, for example, the first adhesive member AD1, the second adhesive member AD2 and the filling member FL are high refractive-index OCA sheets of the same material. The refractive index of the second adhesive member AD2 is equal to that of the first transparent substrate 10, the second transparent substrate 20, the third transparent substrate 30, the fourth transparent 40 and the second cover member CM2. With this configuration, the light entering the second cover member CM2 can easily pass through the second adhesive member AD2 to reach the liquid crystal layers LC1 and LC2. In other words, the light guided in the second cover member CM2 between the end surface E61 and the end surface E62 can be reduced and the light that contributes to scattering can be increased.

Figure 6:
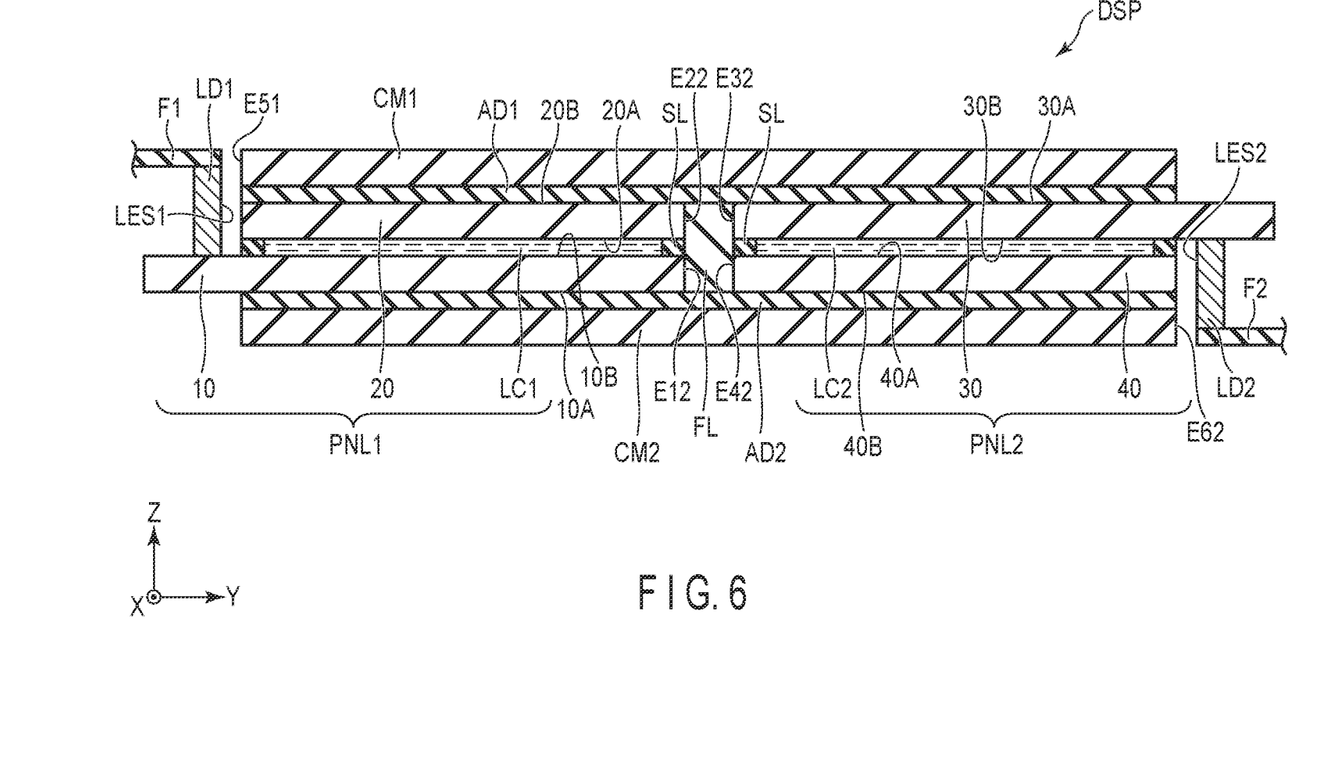
FIG. 6 is a diagram showing the second modified example of the present embodiment.

FIG. 6 shows the second modified example of the embodiment. The configuration shown in FIG. 6 is different from that of FIG. 5 in that the third transparent substrate 30 is located below the fourth transparent substrate 40 in the second display panel PNL2.

The first transparent substrate 10 opposes the fourth transparent substrate 40 via the filling member FL along the second direction Y. The second transparent substrate 20 opposes the third transparent substrate 30 via the filling member FL along the second direction Y. That is, the end surface E12 opposes the end surface E42 along the second direction Y. The end surface E22 opposes the end surface E32 along the second direction Y. The end surface E51 of the first cover member CM1 opposes the light-emitting surface LES1 of each first light-emitting element LD1 along the second direction Y. The end surface E62 of the second cover member CM2 opposes the light-emitting surface LES2 of each second light-emitting element LD2 along the second direction Y.

The first cover member CM1 is adhered to the main surface 20B of the second transparent substrate 20 and the main surface 30A of the third transparent substrate 30. The second cover member CM2 is adhered to the main surface 10A of the first transparent substrate 10 and the main surface 40B of the fourth transparent substrate 40.

For example, the refractive index of the filling member FL and the refractive index of the first adhesive members AD1 and the second adhesive member AD2 are different from each other. In this case, the refractive index of the filling member FL is about 1.51, and the first adhesive member AD1 and the second adhesive member AD2 are, for example, OCA sheets having a refractive index different from that of the filling member FL.

The refractive index of the filling member FL and that of the first adhesive member AD1 and the second adhesive member AD2 may be equal to each other. In this case, the refractive index of the filling member FL, and the refractive index of the filling member FL, the first adhesive member AD1 and the second adhesive member AD2 are about 1.51. In this case, for example, the first adhesive member AD1, the second adhesive member AD2 and the filling member FL are high refractive-index OCA sheets of the same material.

Figure 7:
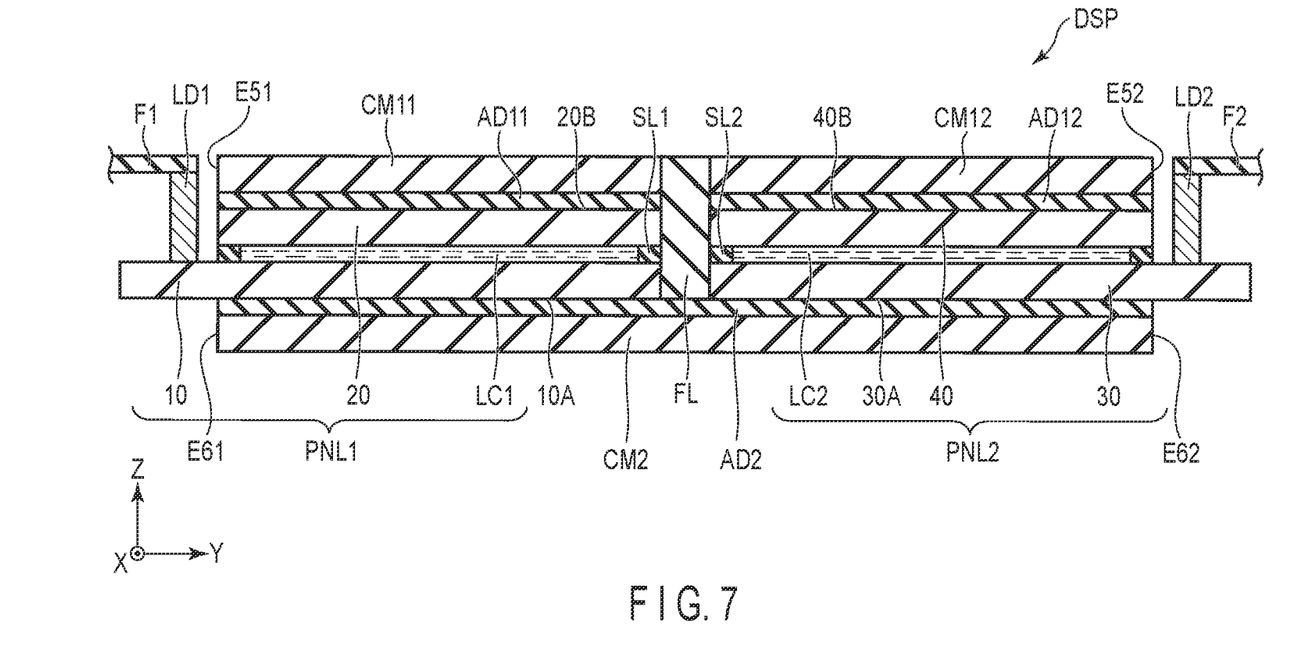
FIG. 7 is a diagram showing the third modified example of the present embodiment.

FIG. 7 shows the third modified example of this embodiment. The configuration shown in FIG. 7 is different from that of in FIG. 5 in that the first cover member CM1 comprises two cover members CM11 and CM12.

The cover member CM11 is adhered to the main surface 20B of the second transparent substrate 20. The cover member CM12 is adhered to the main surface 40B of the fourth transparent substrate 40. The cover member CM11 includes an end surface E51. The cover member CM12 includes an end surface E52. An adhesive member AD11 is located between the first display panel PNL1 and the cover member CM11. An adhesive member AD12 is located between the second display panel PNL2 and the cover member CM12. The filling member FL is located between the cover member CM11 and the cover member CM12 so as to be in contact with both. Further, the filling member FL is located between the adhesive member AD11 and the adhesive member AD12 so as to be in contact with both. Here, let us suppose that the adhesive members AD11 and AD12 together are collectively referred to as the first adhesive member AD1.

For example, the refractive index of the filling member FL and the refractive index of the first adhesive member AD1 and the second adhesive member AD2 are different from each other. In this case, the refractive index of the filling member FL is about 1.51, and the first adhesive member AD1 and the second adhesive member AD2 are, for example, OCA sheets having a refractive index different from that of the filling member FL.

The refractive index of the filling member FL and the refractive index of the first adhesive member AD1 and the second adhesive member AD2 may be equal to each other. In this case, the refractive index of the filling member FL, and the refractive index of the first adhesive member AD1 and the second adhesive member AD2 are about 1.51. Further, here, for example, the first adhesive member AD1, the second adhesive member AD2 and the filling member FL are high refractive-index OCA sheets of the same material.

Figure 8:
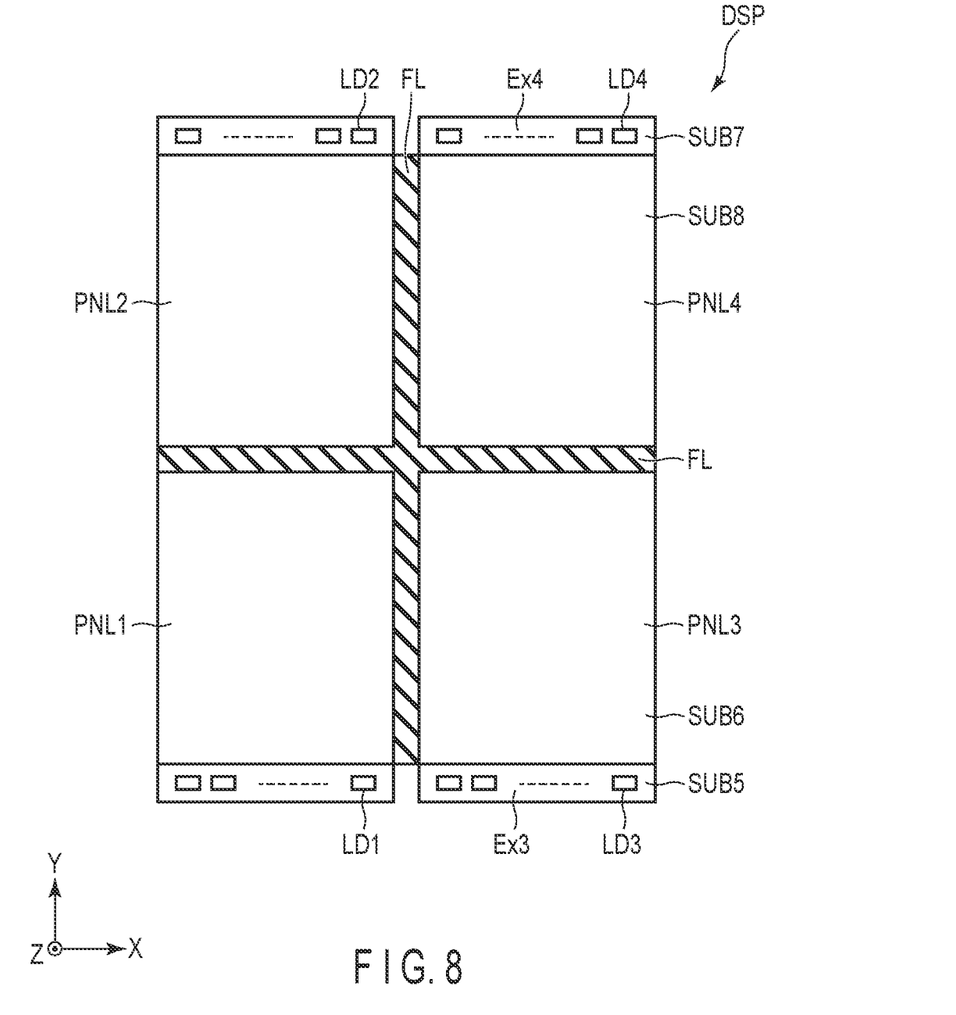
FIG. 8 is a diagram showing the fourth modified example of the present embodiment.

FIG. 8 shows the fourth modified example of the embodiment. The configuration shown in FIG. 8 is different from that of the above-provided embodiment in that the display device DSP has four display panels, namely, a first display panel PNL1, a second display panel PNL2, a third display panel PNL3 and a fourth display panel PNL4.

The third display panel PNL3 and the fourth display panel PNL4 have configurations similar to those of the first display panel PNL1 and the second display panel PNL2, respectively. The third display panel PNL3 comprises a fifth substrate SUB5, a sixth substrate SUB6 and third light-emitting elements LD3. The third light-emitting elements LD3 are superimposed on the extended portion Ex 3. The third light-emitting elements LD3 are aligned to be spaced apart from each other along the first direction X. The fourth display panel PNL4 comprises a seventh substrate SUB7, an eighth substrate SUB8 and fourth light-emitting elements LD4. The fourth light-emitting elements LD4 are superimposed on the extended portion Ex4. The fourth light-emitting elements LD 4 are aligned to be spaced apart from each other along the first direction X.

The fourth display panel PNL4 opposes the third display panel PNL3 on the opposite side to the fourth light emitting elements LD4. The filling member FL is placed between the first display panel PNL1 and the second display panel PNL2, between the first display panel PNL1 and the third display panel PNL3, between the second display panel PNL2 and the fourth display panel PNL4, and between the third display panel PNL3 and the fourth display panel PNL4. The refractive index of the filling member FL is 1.51. The filling member FL may be a high refractive-index OCA sheet. Note that the third modified example shown in FIG. 7 can be combined with any of the above-provided embodiment, the first modified example and the second modified example.

The embodiment and the modified examples are described on the assumption that the refractive index of the filling member FL is equal to the refractive index the first transparent substrate 10, the second transparent substrate 20, the third transparent substrate 30, and the fourth transparent substrate 40. Note, however that similar advantageous effects can be obtained if the difference between the refractive index of the filling member FL and the refractive index of the first transparent substrate 10 to the fourth transparent substrate 40 is less than the difference between the refractive index of the air layer and the refractive index of the first transparent substrate 10 to the fourth transparent substrate 40.

As described above, according to the present embodiments, it is possible to obtain a display device which can suppress the degradation of display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of a display device obtainable from the configurations disclosed herein will be provided as additional notes.

(1) A display device comprising:
  a first display panel comprising a first transparent substrate, a second transparent substrate opposing the first transparent substrate, a first liquid crystal layer located between the first transparent substrate and the second transparent substrate and containing a polymer and a liquid crystal molecule, and a first light-emitting element opposing an end surface of the second transparent substrate;
  a second display panel comprising a third transparent substrate, a fourth transparent substrate opposing the third transparent substrate, a second liquid crystal layer located between the third transparent substrate and the fourth transparent substrate and containing a polymer and a liquid crystal molecule and a second light emitting element opposing an end surface of the fourth transparent substrate, the second display panel opposing the first display panel on an opposite side to the second light emitting element;
  a filling member provided between the first display panel and the second display panel and having a refractive index equal to that of the first transparent substrate, the second transparent substrate, the third transparent substrate and the fourth transparent substrate;
  a first light guide bonded to the first display panel and the second display panel and opposing an emission surface of the first light emitting element; and
  a first adhesive member provided between the first display panel and the first light guide and between the second display panel and the first light guide.

(2) The display device as described in item (1), wherein a refractive index of the first adhesive member is equal to a refractive index of the filling member.

(3) The display device as described in item (2), wherein the first adhesive member and the filling member are each an optically clear adhesive sheet.

(4) The display device as described in item (1), further comprising:
  a second light guide bonded to the first display panel and the second display panel on an opposite side to the first light guide;
  a second adhesive member provided between the first display panel and the second light guide and between the second display panel and the second light guide.

(5) The display device as described in item (4), wherein a refractive index of the first adhesive member, a refractive index of the second adhesive member, and a refractive index of the filling member are equal to each other.

(6) The display device as described in item (5), wherein the first adhesive member, the second adhesive member and the filling member are each an optically clear adhesive sheet.

(7) The display device as described in any one of items (4) to (6), wherein the first transparent substrate opposes the fourth transparent substrate via the filling member, the second transparent substrate opposes the third transparent substrate via the filling member, and the second light guide opposes an emission surface of the second light emitting element.

(8) The display device as described in any one of items (1) to (7), further comprising:

a third display panel comprising a third light-emitting element; and a fourth display panel comprising a fourth light-emitting element and opposing the third display panel on an opposite side to the fourth light-emitting element, wherein the filling member is provided between the first display panel and the third display panel, between the second display panel and the fourth display panel, and between the third display panel and the fourth display panel.

(9) The display device as described in (1) or (4), wherein the filling member is formed of resin.

(10) The display device as described in any one of (1) to (9), wherein the refractive index of the filling member is about 1.51.

(11) The display device as described in any one of (1) to (10), wherein the first transparent substrate includes a first end surface on a side of the second display panel, the second transparent substrate includes a second end surface on a side of the second display panel, the third transparent substrate includes a third end surface on a side of the first display panel, the fourth transparent substrate includes a fourth end surface on a side of the first display panel, and the filling member is in contact with the first end surface, the second end surface, the third end surface and the fourth end surface.

What is claimed is:

1. A display device comprising:

a first display panel comprising a first transparent substrate, a second transparent substrate opposing the first transparent substrate, a first liquid crystal layer located between the first transparent substrate and the second transparent substrate and containing a polymer and a liquid crystal molecule, and a first light-emitting element opposing an end surface of the second transparent substrate;

a second display panel comprising a third transparent substrate, a fourth transparent substrate opposing the third transparent substrate, a second liquid crystal layer located between the third transparent substrate and the fourth transparent substrate and containing a polymer and a liquid crystal molecule and a second light emitting element opposing an end surface of the fourth transparent substrate, the second display panel opposing the first display panel on an opposite side to the second light emitting element;

a filling member provided between the first display panel and the second display panel and having a refractive index equal to that of the first transparent substrate, the second transparent substrate, the third transparent substrate and the fourth transparent substrate;

a first light guide bonded to the first display panel and the second display panel and opposing an emission surface of the first light emitting element; and a first adhesive member provided between the first display panel and the first light guide and between the second display panel and the first light guide.

2. The display device of claim 1, wherein a refractive index of the first adhesive member is equal to a refractive index of the filling member.

3. The display device of claim 2, wherein the first adhesive member and the filling member are each an optically clear adhesive sheet.

4. The display device of claim 1, further comprising:

a second light guide bonded to the first display panel and the second display panel on an opposite side to the first light guide; and a second adhesive member provided between the first display panel and the second light guide and between the second display panel and the second light guide.

5. The display device of claim 4, wherein a refractive index of the first adhesive member, a refractive index of the second adhesive member, and a refractive index of the filling member are equal to each other.

6. The display device of claim 5, wherein the first adhesive member, the second adhesive member and the filling member are each an optically clear adhesive sheet.

7. The display device of claim 4, wherein the first transparent substrate opposes the fourth transparent substrate via the filling member, the second transparent substrate opposes the third transparent substrate via the filling member, and the second light guide opposes an emission surface of the second light emitting element.

8. The display device of claim 1, further comprising:

a third display panel comprising a third light-emitting element; and a fourth display panel comprising a fourth light-emitting element and opposing the third display panel on an opposite side to the fourth light-emitting element, wherein the filling member is provided between the first display panel and the third display panel, between the second display panel and the fourth display panel, and between the third display panel and the fourth display panel.

9. The display device of claim 1, wherein the filling member is formed of resin.

10. The display device of claim 1, wherein the refractive index of the filling member is about 1.51.

11. The display device of claim 1, wherein the first transparent substrate includes a first end surface on a side of the second display panel, the second transparent substrate includes a second end surface on a side of the second display panel, the third transparent substrate includes a third end surface on a side of the first display panel, the fourth transparent substrate includes a fourth end surface on a side of the first display panel, and the filling member is in contact with the first end surface, the second end surface, the third end surface and the fourth end surface.

* * * * *